United States Patent
Schaeffer et al.

(10) Patent No.: US 10,479,491 B2
(45) Date of Patent: Nov. 19, 2019

(54) SYSTEM AND METHOD FOR ROTORCRAFT COLLECTIVE POWER HOLD

(71) Applicant: Bell Helicopter Textron Inc., Fort Worth, TX (US)

(72) Inventors: Joseph M. Schaeffer, Bensalem, PA (US); Luke Dafydd Gillett, Grapevine, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 167 days.

(21) Appl. No.: 15/679,645

(22) Filed: Aug. 17, 2017

(65) Prior Publication Data

US 2019/0055004 A1 Feb. 21, 2019

(51) Int. Cl.
  *B64C 27/57* (2006.01)
  *B64C 13/18* (2006.01)
  (Continued)

(52) U.S. Cl.
  CPC .............. *B64C 27/57* (2013.01); *B64C 13/18* (2013.01); *B64C 13/503* (2013.01); *G05D 1/0077* (2013.01); *G05D 1/042* (2013.01); *G05D 1/0858* (2013.01); *B64D 31/06* (2013.01); *G05D 1/0061* (2013.01); *G05D 1/0066* (2013.01); *G05D 1/063* (2013.01); *G05D 1/0653* (2013.01)

(58) Field of Classification Search
  CPC ....... B64C 27/57; B64C 13/18; B64C 13/503; G05D 1/0077; G05D 1/0858; G05D 1/042; G05D 1/0061
  See application file for complete search history.

(56) References Cited

U.S. PATENT DOCUMENTS 4,563,743 A * 1/1986 Murphy et al. ...... G05D 1/0858 701/4
4,564,908 A * 1/1986 Clelford et al. ..... G05D 1/0858 701/8

(Continued)

FOREIGN PATENT DOCUMENTS

EP 2631172 A2 8/2013
EP 2631172 A3 3/2014

(Continued)

*Primary Examiner* — Dale W Hilgendorf
(74) *Attorney, Agent, or Firm* — Slater Matsil, LLP

(57) ABSTRACT

A method for operating a rotorcraft includes providing a power hold by performing monitoring one or more operational parameters of the rotorcraft during flight, determining whether operational parameters need adjustment according to a relationship between the operational parameters and operating limits associated with a power setting for the power hold, and determining a flight parameter for one or more flight control devices of the rotorcraft in response to determining that the operational parameters need adjustment. Providing the power hold further includes sending a position set signal to a trim assembly of the rotorcraft to set a first position of a pilot control connected to the trim assembly according to a pilot control setting generated according to the flight parameter, and controlling a flight control device control according to a second position of the pilot control.

20 Claims, 7 Drawing Sheets

(51) Int. Cl.
   *G05D 1/00*   (2006.01)
   *G05D 1/04*   (2006.01)
   *G05D 1/08*   (2006.01)
   *B64C 13/50*  (2006.01)
   *G05D 1/06*   (2006.01)
   B64D 31/06    (2006.01)

(56) References Cited

U.S. PATENT DOCUMENTS

| | | | |
|---|---|---|---|
| 6,012,676 A * | 1/2000 | Gold et al. | G05D 1/0858 701/4 |
| 7,908,044 B2 * | 3/2011 | Piasecki et al. | G05D 1/0858 701/4 |
| 8,655,510 B2 * | 2/2014 | Eglin | B64C 27/26 701/3 |
| 2017/0088281 A1 * | 3/2017 | Vallart et al. | B64C 27/12 |

FOREIGN PATENT DOCUMENTS

| | | | |
|---|---|---|---|
| EP | 2774845 A1 | 9/2014 | |
| EP | 2801522 A1 | 11/2014 | |
| EP | 2810872 A1 | 12/2014 | |
| EP | 2810873 A1 | 12/2014 | |

* cited by examiner

SYSTEM AND METHOD FOR ROTORCRAFT COLLECTIVE POWER HOLD

TECHNICAL FIELD

The present invention relates generally to a system and method for automated flight control in a rotorcraft, and, in particular embodiments, to a system and method for a collective power hold for a rotorcraft.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment system, a rotorcraft includes a collective control and a collective position sensor connected to the collective control, and the collective position sensor is operable to generate collective position signals indicating a position of the collective control. A flight control computer (FCC) is in signal communication with the collective position sensor and is operable to provide a power hold for the rotorcraft in response to a power hold activation signal and further in response to a first one of the collective position signals indicating that the collective control is overdriven. The FCC is further operable to determine a power setting for the power hold and one or more operational limits associated with the power hold. The rotorcraft further includes a collective trim motor connected to the collective control and in signal communication with the FCC and one or more flight control devices connected to the FCC and operable to control flight of the rotorcraft in response to a flight control device control signal received from the FCC. The FCC is operable to determine a flight parameter for the one or more flight control devices according to a relationship between the one or more operational limits and one or more operational parameters indicated by one or more sensor signals received at the FCC, and is further operable to determine a pilot control setting according to the flight parameter and generate a collective set command according to the pilot control setting. The collective trim motor is operable to move the collective control according to the collective set command, and wherein the FCC is operable to generate the flight control device control signal according to a second one of the collective position signals, and to send the flight control device control signal to the one or more flight control devices.

An embodiment flight control system computer (FCC) for a rotorcraft includes a processor and a non-transitory computer-readable storage medium storing a program to be executed by the processor, the program including instructions for providing a power hold. The instructions for providing the power hold include instructions for adjusting one or more flight parameters according to an operational limit associated with a power setting selected according to at least an operating regime of the rotorcraft, controlling positioning of one or more pilot controls according to the flight parameters, and controlling one or more flight control devices of the rotorcraft according to positioning of the one or more pilot controls.

An embodiment of a method for operating a rotorcraft includes providing a power hold by performing monitoring one or more operational parameters of the rotorcraft during flight, determining whether at least one of the one or more operational parameters need adjustment according to a relationship between the one or more operational parameters and one or more operating limits associated with a power setting for the power hold, and determining a flight parameter for one or more flight control devices of the rotorcraft in response to determining that at least one of the one or more operational parameters need adjustment. Providing the power hold further includes sending a position set signal to a trim assembly of the rotorcraft to set a first position of a pilot control connected to the trim assembly according to a pilot control setting generated according to the flight parameter, and controlling a flight control device control according to a second position of the pilot control.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
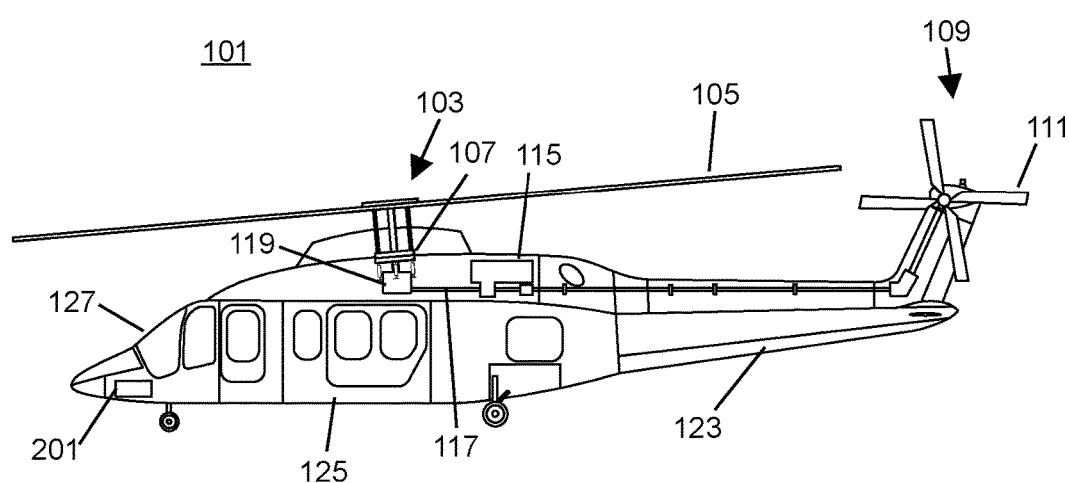
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or work with any suggested flight parameters suggested by the FBW system. Additionally, in providing enhanced control and automated functionality for rotorcraft flight, the FBW must maintain an intuitive and easy to use flight control system for the pilot. Thus, the FBW system adjusts the pilot flight controls so that the controls are in a position associated with the relevant flight parameter. For example, the FBW may adjust the collective stick to provide suggested or FBW controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system presented herein are directed to providing a system and method for a power hold in a rotorcraft. Flight control systems of the rotorcraft provide a subsystem that automatically causes the rotorcraft to fly with, or hold, a selected power setting on the collective control. The power setting is monitored in real time and the collective position is continuously, automatically, adjusted to maintain the engine operating parameters at their limits or within acceptable operating ranges. The power hold system permits a pilot to select a power setting that is automatically executed by the FBW system without requiring pilot intervention. The flight control system sets the engine to operate at a selected power setting and adjusts the collective setting to optimize the performance of the rotorcraft while maintaining the main rotor revolutions per minute (RPM) within a selected range. Setting the power hold reduces pilot workload and permits a pilot to concentrate "out the windshield" by reducing the need to monitor, for example, collective setting, engine temperature, turbine RPM, engine torque or other related rotorcraft operating parameters. Additionally, the power hold system continuously monitors the engine temperature, engine turbine RPM and engine torque to maintain an optimized collective setting for the selected power level.

In some embodiments, the pilot may select a power setting that is used for the power hold and that indicates a set of operating limits for one or more operating parameters such as engine torque, engine temperature and engine speed or RPM, and the FCCs may determine an initial collective setting based on the limits associated with the power setting. For example, the FCCs may determine an estimated power that would generated if the engine were to run at, or at some predetermined setting below, the limits, and determine a collective setting that would effectively use the calculated power output. The power settings may be related to the duration an engine is rated to run at the power setting. For example, a power setting used for a power hold may be maximum continuous power (MCP), maximum takeoff power (MTOP), thirty second maximum power (30SMP), two minute maximum power (2MMP). Various parts and subsystems for engines, transmission, control systems and the like are rated for wear based on use time at a particular usage level, with different components needed replacement or at least inspection based on the amount and type of use. Operating a system in a rotorcraft, particularly, the engine, past specified operating parameters results in "burning up time on the engine" due to the increased wear and stress caused by exceeding the specified limits, and may require additional maintenance or inspection of the relevant system.

The different power ratings are determined according to the stress or wear that the relevant power setting puts on the engine, main rotor transmission system, main rotor, control systems, and the like. For example the MCP setting is a maximum power setting that rotorcraft components are rated to be able to continuously sustain, while a MTOP is a maximum power setting that rotorcraft components are rated to be able to sustain for a limited time, such as 5 minutes. The MTOP is generally higher than the MCP, and is a generally recommended for ordinary situations such as takeoff where extra power beyond a cruising power may be required. In case of an emergency situation, a pilot may need additional power over what MTOP provides. For example, in the case of an engine failure (in a multi-engine rotorcraft) during takeoff, a pilot may need to use a contingency power setting in order to stabilize and/or land the rotorcraft. The 2MMP and 30SMP settings may be considered contingency power settings, and may define power settings for which the rotorcraft components are rated top operate at for two minutes or thirty seconds, respectively.

For example, the power requirements for rotorcraft flight at moderate speeds, for example, around 40 knots, are lower than the power requirements for flight at hover or slow speeds. A pilot transitioning from slow speed flight to moderate speed flight may have excess power that becomes available as the rotorcraft accelerates. Thus, as a pilot takes off, accelerating through low speed to a moderate speed, the pilot may want to use a MTOP setting, and may have increased power available for additional collective and additional climb as the rotorcraft accelerates. Likewise, as a pilot decelerates from a moderate speed to a slower speed, for example, for landing, maneuvering, or approach, the power requirements for flight increase. As a rotorcraft being flown under MTOP slows, the pilot risks the operating parameters of the engines exceeding relevant operating limits without lowering the collective and, in turn, lowering the power required to maintain the main rotor speed. In another example, since the density of air decreases as altitude increases, a rotorcraft's engines may become less efficient and provide less power. Thus, a rotorcraft operating at high altitude with a relatively high air temperature may be likely to have engine temperature as a primary limiting performance factor, and the rotorcraft may need to reduce the power requirements of the main rotor as the rotorcraft ascends and the engine becomes less efficient. In another example, the weight or payload of a rotorcraft affects the performance and power requirements of the rotorcraft. Thus, a rotorcraft that is relatively heavy and flying at cold air temperatures may have an engine torque limit as a primary limiting performance factor.

The FCCs may receive operating parameter feedback from sensors in, or monitoring, the engines to determine the engine temperature, speed (or RPM) and torque. In some embodiments, the FCCs receive an instruction from the pilot to enter a power hold while the pilot has the collective stick in an overdrive position. When the pilot engages the power hold the FCCs drive the collective stick to a position associated with the selected power level, and monitor engine temperature, engine speed or turbine RPM and engine torque. The FCCs may use the operating parameter feedback from the engines to determine whether any of the monitored operating parameters are near, or approaching a relevant limit, and adjust the collective or engine power settings to reduce the power required from the engine to lower operating parameters such as the temperature of the turbine combustion chamber, the speed or RPM of the engine compressor turbine, or the torque output at the shaft of the engines. The reduction of the power required from the engines permits the engine to be operated at reduced operating parameters and avoid exceeding the engine operating parameter limits. While the FCCs may adjust the collective pitch of the main rotor blades to a lower angle of attack to reduce power required to maintain the main rotor RPM, the FCCs may also adjust the collective pitch of the main rotor blades to a higher angle to take advantage of unused power available at the engines.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
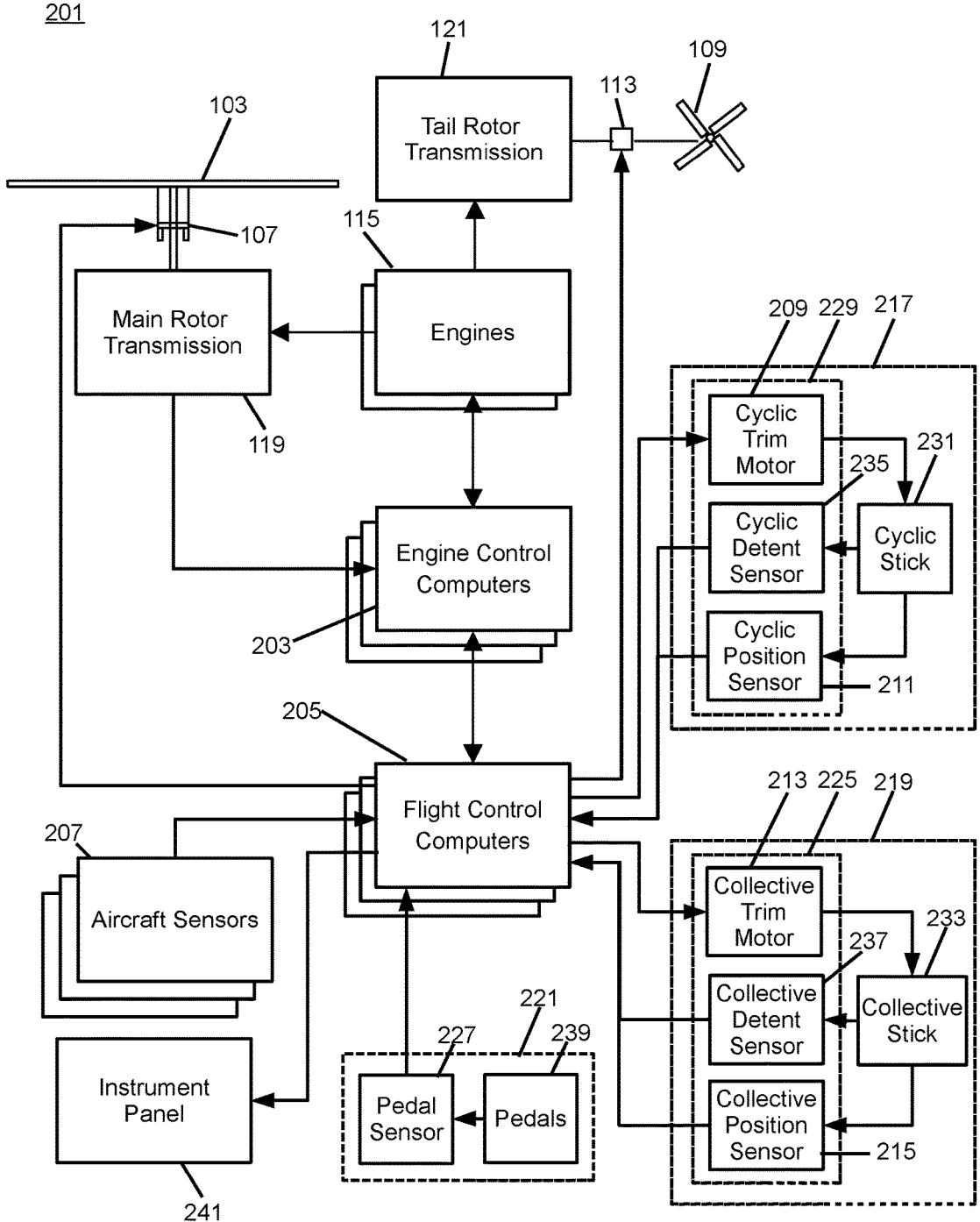
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured RPM of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
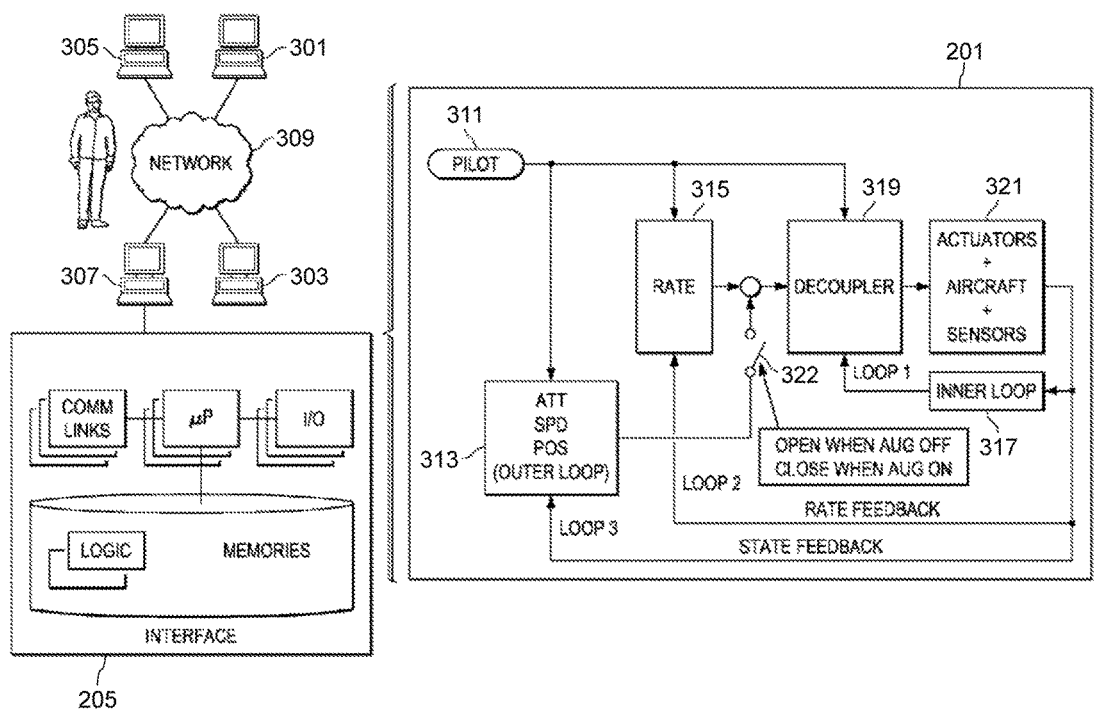
FIG. 3 representatively illustrates a three-loop flight control system 201 according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 101 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

In some embodiments, the power hold function may be implemented or controlled in the outer loop 313. In an embodiment, the power hold may be software running on the FCCs 205, and may cause the inner loop 317 to perform a power hold by activating a state machine that monitors feedback from the ECCUs indicating the engine operating parameters and adjusts the collective accordingly. The inner loop 317 may receive sensor data from aircraft equipment 321 such as sensors or other instrumentation, and adjust the collective stick position, collective setting and/or power setting to maintain the engine operating parameters within the limits of the selected power setting. Thus, the inner loop 317 may continuously monitor the engine operating parameters and adjust flight parameters such as the collective setting accordingly. In another embodiment, the outer loop 313 may receive a command to set the power hold at a pilot input 311 such as the collective stick, and determine the limits of the selected power setting. The outer loop 313 may monitor feedback from the ECCUs, determine any adjustments to the collective setting, and then cause, signal or message the inner loop 317 to set, adjust or hold the collective stick position.

Figure 4A:
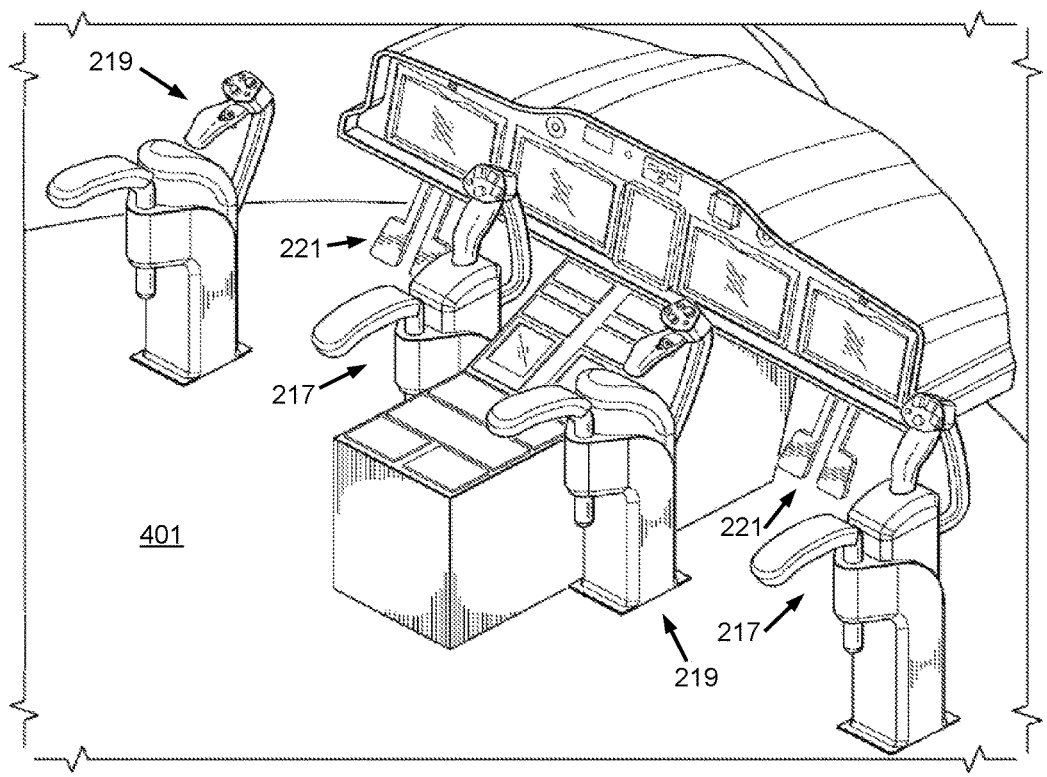
FIG. 4A is a diagram illustrating a cockpit control arrangement according to some embodiments.

FIG. 4A is a diagram illustrating a cockpit control arrangement 401 according to some embodiments. In some embodiments, a rotorcraft has three sets of pilot flight controls in three flight control assemblies that include cyclic control assemblies 217, collective control assemblies 219, and pedal control assemblies 221. A set of each pilot flight control is provided for each pilot (which may include a pilot-in-command and a co-pilot or backup pilot).

In general, cyclic pilot flight controls may allow a pilot to provide cyclic inputs through the cyclic control assembly 217 to set or adjust a cyclic configuration of the main rotor blades, which changes the angle of the individual main rotor blades as the main rotor rotates. This creates variable amounts of lift at varied points in the rotation cycle, causing the rotorcraft to pitch or roll. Collective pilot flight controls may allow a pilot to provide collective inputs through the collective control assembly 219 to set or adjust a collective configuration of the main rotor blades so that the angle of attack for all main rotor blades may be collectively altered by equal amounts and at the same time, resulting in ascent, descent, acceleration, and deceleration. Anti-torque pilot flight controls may allow a pilot to change the amount of anti-torque force applied to the rotorcraft. Tail rotor blades may operate to counter torque created by driving the main rotor. Anti-torque pilot flight controls may allow a pilot to provide pedal inputs through the pedal control assembly 221 and change the amount of anti-torque force applied to change a heading of the rotorcraft. For example, providing anti-torque force greater than the torque created by driving the main rotor may cause the rotorcraft to rotate in a first direction. Similarly, providing anti-torque force less than the torque created by driving the main rotor may cause the rotorcraft to rotate in a second direction opposite the first direction. In some embodiments, anti-torque pilot flight controls may change the amount of anti-torque force applied by changing the pitch of the tail rotor blades, and increasing or reducing thrust produced by tail rotor blades.

Figure 4B:
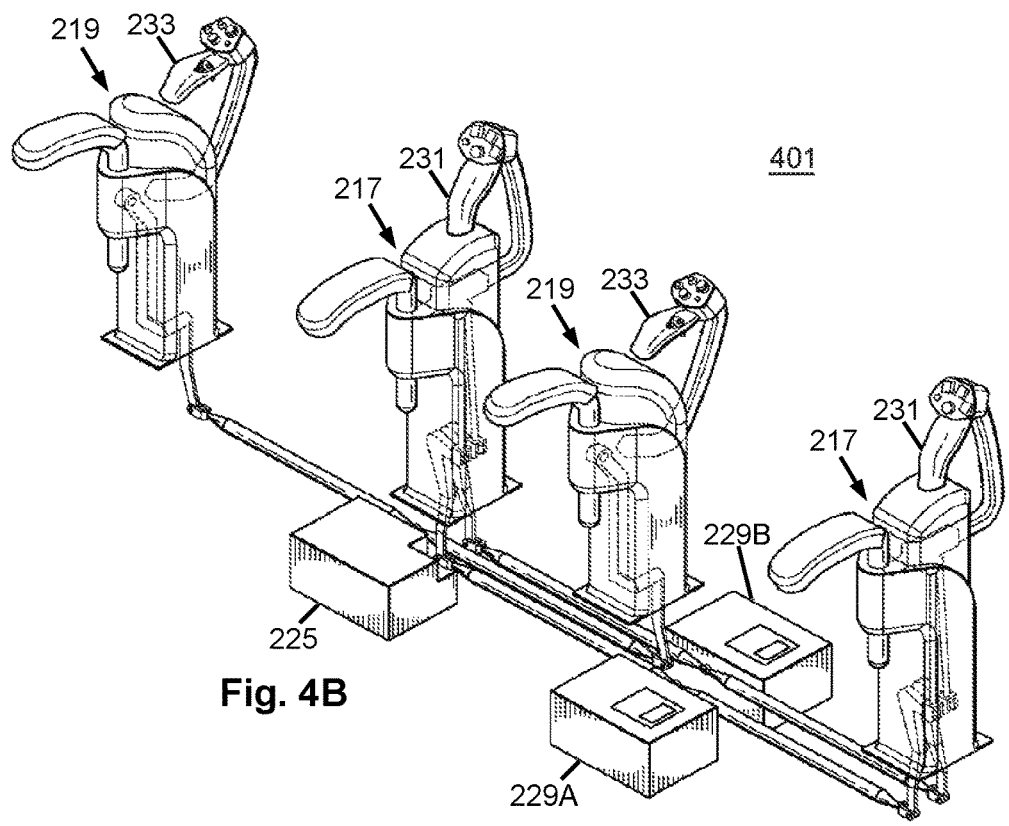
FIG. 4B is a diagram illustrating an arrangement of cyclic and collective control assemblies according to some embodiments.

FIG. 4B is a diagram illustrating an arrangement of cyclic and collective control assemblies 217 and 219 according to some embodiments. In some embodiments, two cyclic control assemblies 217 and two collective control assemblies 219 are provided. The cyclic control assemblies 217 each have a cyclic stick 231 that is coupled to cyclic trim assemblies 229A and 229B. The collective control assemblies 219 each have collective stick 233 that is coupled to a collective trim assembly 225. The trim assemblies 225, 229A and 229B are operable to receive and measure mechanical communications of cyclic and collective inputs from the pilot through the respective sticks 231 and 233. In some embodiments, two cyclic trim assemblies 229A and 229B are provided and are connected to each of the cyclic control assemblies 217. One of the cyclic trim assemblies is a cyclic roll trim assembly 229A that manages roll or left/right cyclic tilting movements, and the other cyclic trim assembly is a cyclic pitch trim assembly 229B that manages pitch or front/back tilting movements. In some embodiments, the trim assemblies 225, 229A and 229B convert mechanical inputs into roll, pitch and collective position signals that are sent to the FCCs. These trim assemblies 225, 229A and 229B may include, among other items, measurement devices for measuring the position of the collective sticks 233 or the different movement axes of the cyclic sticks 231. Trim motors in each of the trim assemblies 225, 229A and 229B may drive or set the positions of the cyclic control assembly 217 or collective control assembly 219.

The cyclic trim assemblies 229A and 229B, and collective trim assembly 225 may be components of a FBW flight control system, and measurements from the cyclic trim assemblies 229A and 229B and collective trim assembly 225 may be sent to a FCC operable to instruct flight control devices to execute commands measured through the trim assemblies 225, 229A and 229B. For example, the FCC may be in communication with actuators or other devices operable to change the position of main rotor blades, and the FCC may generate cyclic control commands and/or collective control commands which are sent to the swashplate actuators or control system to control the angle of the main rotor blades.

Figure 4C:
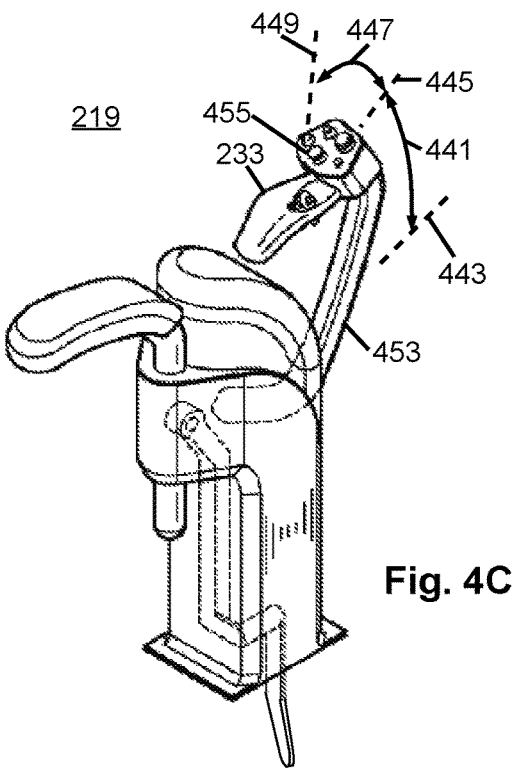
FIG. 4C is a diagram illustrating a collective control assembly and range of motion according to some embodiments.

FIG. 4C is a diagram illustrating a collective control assembly 219 and range of motion according to some embodiments. In some embodiments, the collective stick 233 is mounted on a collective stick support 453, and moves in an arc to indicate the collective position. In the FBW system, the collective stick 233 may be physically decoupled from the swashplate and engines, so that the range of motion of the collective stick 233 is not limited by the connection to the swashplate or engines. The collective trim assembly 219 may monitor and determine the position of the collective stick 233, and the FCCs may determine a collective setting according to the position of the collective stick. In order to maintain the main rotor speed at a substantially constant RPM, the collective setting may be tied to the engine settings so that the engine provides sufficient power to maintain the rotor speed.

The collective stick 233 may have a low position 443 and a high position 445 that are respectively associated with a lowest collective setting and a maximum normal collective setting for the main rotor blades. The low position 443 and high position 445 may define or bound a normal operating range 441. In some embodiments, the normal operating range 441 includes collective settings that correspond to power settings below the MCP. The collective stick 233 may also have a maximum position 449 associated with a collective setting corresponding to the maximum settable power. An overdrive range 447 may be defined or bounded by the maximum position 449 and the high position 445, and may include collective settings corresponding to power setting higher than the normal operating range. In some embodiments, the overdrive range 447 includes the MTOP, 30SMP and 2MMP power settings. The low position 443, high position 445 and maximum position 449 may be stops or positions that are enforced or created by the collective trim assembly.

In some flight situations, a pilot may need to power the rotorcraft beyond the normal operating parameters or continuous power rating, for example, during takeoff or landing, or during an emergency. The pilot may overdrive the collective by raising the collective stick 233 into the overdrive range 447 to get extra power from the engine and extra performance from the main rotor. The trim motors in the trim assemblies may be used to provide tactile cues to indicate to a pilot that that the collective stick 233 is overdriven or in the overdrive range 447. The trim motor may turn on when the collective stick moves past the high position 445 to provide a tactile, haptic or other physical indication to the pilot that the collective stick 233 has moved past the high position 445. In some embodiments, the high position 445 may be variable, with the FCC correlating different collective stick positions with the high position 445, or top of the normal operating range based on one or more rotorcraft operating parameters. For example, should the pilot lose an engine during flight, the overall power available from the engines will drop below that supplied by two normally operating engines. The FCCs may determine that a lower collective position would correlate with the MCP for a single engine, and cause the trim motor to indicate that the high position 445 is at a different collective stick angle that the angle for MCP under two operating engines.

When a pilot overdrives the collective stick 233, the trim motor may drive or apply force to the collective stick support 453 to push the collective stick 233 out of the overdrive range 447. The pilot may override the drive or force applied by the trim motor and may maintain the collective stick 233 in the overdrive range 447. However, the pilot will feel the pressure from the trim motor pulling the collective stick 233 out of the overdrive range 447 and into the normal operating range 441.

In some embodiments, the power hold feature may be set by the pilot while the collective stick 233 is in the overdrive range 447 by activating one or more collective stick buttons 455. In a particular and non-limiting embodiment, the collective stick button 455 may be a force trim release (FTR) button disposed on a face of the collective stick 233, and the pilot may activate the FTR button to set the power hold. In some embodiments, the FCCs may activate the power hold in response to the collective stick button 455 activation when the collective is in the overdrive range 447, and activate a different function in response to the collective stick button 455 activation when the collective is in the normal operating range 441. For example, when the FTR button is activated by the pilot, the FCCs may engage the power hold function if the collective stick is in the overdrive range 447, and engage a second function, such as a vertical speed hold function, if the collective stick is in the normal operating range 441.

In other embodiments, the power hold feature and power setting may each be separately set by activating a button, or different buttons or devices on the instrument panel, on the cyclic stick, by selecting an option in a flight director, autopilot, multifunction interactive control system, dedicated power hold system, or the like. Additionally, the power hold feature may be cleared or turned off by, for example, activating the same button or option used to activate the power hold. In some embodiments, the power hold may also be turned off when the pilot manually moves the collective stick 233 into the normal operating range 441, after the collective stick 233 have been held in the normal operating range for a predetermined period of time, or after the collective stick 233 has been moved into another predetermined operating range or position.

A power setting may be selected by the pilot before or during the power hold, and the FCC may store one or more default or pre-selected power settings, and one or more selected power settings. During the power hold, the trim motor drives the collective stick to a collective position associated with a selected power setting. The power setting is selected by a pilot from groups of available power settings that may correspond to different operating parameters of the rotorcraft. For example, for a twin turbine rotorcraft, different power settings may be available when the aircraft is operating in different operation regimes, such as operating on one engine or two engines. In some embodiments, a group of available power settings for operation on two engines or a twin engine operating regime may include MCT and MTOP settings, while a group of available power settings for operation on one engine in a single engine operating regime may include MCT, 2MMP and 30SMP settings. In some embodiments, the FCC may store a default power setting for the twin engine operating regime and a second default power setting for the single engine operating regime. In other embodiments where more sets of operating parameters are associated with different groups of available of power settings, the FCCs may store default power settings for each set of operating parameters or operating regimes. The FCCs may also store a selected power setting for each set of operating parameters once the power setting has been selected by the pilot, and the default power settings maybe used until the pilot selects a power setting for the operating conditions of the rotorcraft. The default power settings may be a maximum power setting for a particular operating regime. For example, the FCC may have a MTOP power setting as the default for twin engine operation, and a 30SMP setting as the default for single engine operation. Thus, if the rotorcraft loses an engine while in power hold mode, the FCCs will default to the 2MMP setting if the pilot has not previously selected a power setting for single engine operation. Changing the power setting when operating regime, namely the number of operating engines, changes prevents a collective setting requiring twin engine power from being applied when only a single engine is available, which may overdrive the single remaining engine beyond acceptable limits.

The pilot may select or change the selected power control setting before or during a power hold. For example, during startup, the pilot may set the power hold setting to MTOP in preparation for takeoff. To takeoff, the pilot may move the collective stick 233 into overdrive, and activate the collective stick button. The FCCs would engage the power hold using the MTOP power setting, and maintain the collective and engine power at settings that keep the engine operating parameters at, or just below, the operating limits associated with the MTOP power setting. The pilot would then allow the FCCs to control ascent of the helicopter under MTOP. Should the helicopter lose an engine during the takeoff and while the rotorcraft is under a power hold, the FCCs may use a default or selected power setting for single engine operations, for example, the 30SMP setting, and may change the collective and engine settings to correspond to the new power setting. In another example, should the takeoff proceed normally, the pilot may switch the selected power setting from the originally selected MTOP setting to an MCP setting in order to continue departure under a more conservative power setting.

Figure 5:
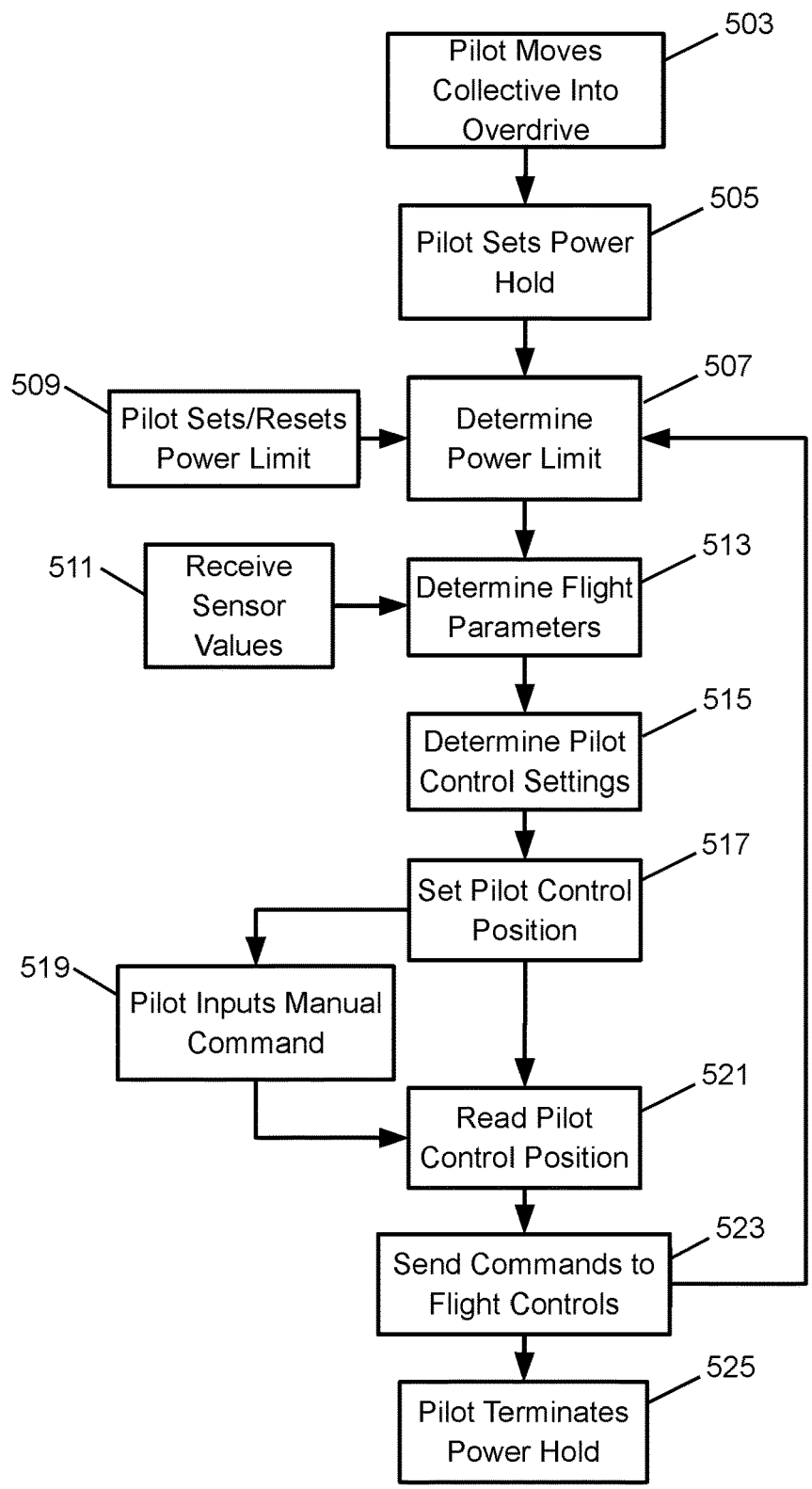
FIG. 5 is a flow diagram illustrating a method for performing a power hold according to some embodiments.

FIG. 5 is a flow diagram illustrating a method 501 for performing a power hold according to some embodiments. In block 503, the pilot moves the collective stick into overdrive. In some embodiments, the pilot moves the collective into a position identified by the FCCs as an overdrive collective position. In some embodiments, while the collective stick is in overdrive, the FCCs may cause the trim motors to exert a force on the collective stick that tends to drive the collective stick out of overdrive.

In block 505, the pilot sets the power hold. In some embodiments, the pilot sets the power hold by activating a power hold indication device such as button, an FTR switch or another device. The button or power hold indication device communicates a power hold activation signal to the FCCs, which determine whether the power hold can be set. In some embodiments, the FCCs determine that the power hold may be activated in response to the collective stick being in the overdrive range and the power hold indication device being activated.

In block 509, a pilot may optionally set one or more power limits for the power hold function. In block 507, the FCCs determine the power limit. In some embodiments, the FCCs may determine an operating regime, such as twin engine operation or single engine operation, and, based on the operating regime may determine the power limit. The FCC may determine the operating regime, and then determine whether the pilot has entered a power limit selection for the determined operating regime. If the pilot has not entered or selected the power limit setting, the FCCs may use a default power limit setting associated with the operating regime.

In block 511, the FCCs receive sensor values. In some embodiment, the FCCs may receive one or more sensor values from the ECCUs, such as engine temperature, engine torque and/or engine speed. In some embodiments, the FCCs may also receive sensor values indicating the collective setting from sensors monitoring the collective or swashplate actuators and from sensors monitoring the main rotor transmission or main rotor head. In other embodiments, the FCCs track and store the collective setting after sending collective commands to swashplate actuators.

In block 513, the FCCs determine flight parameters. The flight parameters are parameters at which the FCCs determine the rotorcraft should operate at to avoid exceeding operating limits associated with the power hold setting. Operating parameters of the rotorcraft indicated by the sensor values may be compared to a corresponding limit, and the FCCs may determine whether one or more operating parameters are approaching or operating above the respective limit. Thus, when one of the operating parameters is approaching the associated limit, the FCCs may determine that the relevant operating parameter is approaching the related limit and that the relevant operating parameter needs to be mitigated or that the pilot control setting needs to be optimized or adjusted, for example, by reducing the collective setting to decrease the engine power required to maintain the main rotor RPM. In some embodiments, the FCCs determine operating parameters such as an engine combustion chamber temperature, a turboshaft torque and a turbine RPM, and the like according to the sensor values, and compare the operating parameters to the associated limits.

In some embodiments, the FCCs may directly compare the operating parameters to the associated limits, and, in other embodiments, the FCCs may determine the rate of change of each operating parameter as well as the value of each operating parameter. For example, the FCCs may determine that an operating parameter needs to be mitigated if the operating parameter is within a fixed amount or fixed range of the relevant operating limit, if the operating parameter is within a predetermined percentage of the relevant operating limit, greater than a predetermined percentage of the relevant operating limit, or the like. Thus, the FCCs may determine to mitigate, for example, an engine temperature that is within 25° C. of the temperature limit, or within 3% of the temperature limit. In another example, example, the FCCs may store previous values for the engine temperature, engine torque and engine RPM so that the FCCs may determine a rate at which each is changing using a predictive procedure such as a derivative to determine the slope of the parameter values, a geometric projection, algorithm or the like. The FCCs may determine that a particular operating parameter needs to be mitigated according to the rate of change and the value of the operating parameter indicating that the operating parameter may exceed the relevant limit within some predetermined time period. For example, for an engine where the engine temperature limit at the selected power setting is 900° C., when the engine is operating at 850° C., and the engine temperature is increasing 1° C. per second, the FCCs may determine, using a derivative or straight line projection, that the engine temperature will reach the limit in 50 seconds. When the engine is operating at 800° C., and the engine temperature is increasing by 5° C. per second, the FCCs may determine that the engine temperature will reach the limit in 12 seconds. If the predetermined time period, or time threshold, is 30 seconds, the engine operating at 800° C. would fall within the threshold and need to have its temperature mitigated, while the engine operating at 850° C. would not.

In block 515 the FCCs determine pilot control settings according to the determined flight parameters. In some embodiments, the FCCs may determine a collective setting to be applied to the main rotor according to, for example, the operating conditions of the rotorcraft and the operating parameters or limits associated with the power selected power limit. Additionally, the FCCs may determine an engine speed or power setting to go with the collective setting. In some embodiments, the FCCs determine a collective setting according to sensor values indicating an engine combustion chamber temperature, a turboshaft torque and a turbine RPM. The FCCs may determine an engine power setting, or may rely on the ECCUs to match the engine power output to the collective setting. The FCCs may determine that a collective setting needs to be adjusted based on the operating parameters and associated limits, and may determine the magnitude of any adjustment based on, for example, the rate of change of a particular operating parameter and the value of the operating parameter in relation to the associated limit. Thus, an operating parameter that is near a limit, or rapidly increasing near a limit, may cause the FCCs to reduce the collective more than an operating parameter that is farther from a limit or increasing less rapidly.

In block 517, the FCCs set the pilot control position. In order to set the determined collective position, the FCCs send a collective set command to the collective trim motor, which drives the collective stick to the determined pilot control position. In block 519, a pilot may optionally input a manual command by manually moving the collective stick. Thus, the pilot may override the position set by the trim motor. In block 521, the collective position sensor in the collective trim assembly detects the position of the collective stick, and sends a collective position signal to the FCCs. Thus, the collective position sensor does not need to determine whether the collective is positioned by the trim motor or by the pilot. In block 523, the FCCs send commands to the flight controls according to the collective position signal, resulting in a change to the collective setting. In some embodiments, the FCCs may repeat the process of determining the power limit and adjusting or setting the flight controls according to the power setting limits until the pilot terminates the power hold in block 525 by, for example, activating the power hold indication device while the power hold is in effect.

While the method 501 disclosed herein has been described in terms of discrete blocks, it should be understood that the method is not limited to the disclosed order of blocks. The FCCs continue to monitor the power limits and operation parameters, and adjust or set the collective setting and/or engine settings to while the power hold remains active. In some embodiments, for example, the receiving sensor values, determining flight parameters, determining pilot control settings and setting pilot control position is a continuous feedback process, and the power hold may be turned off at any time. Additionally, the pilot may override the power hold by taking control of, or manipulating, the collective stick to operate according to explicit pilot commands.

Figure 6:
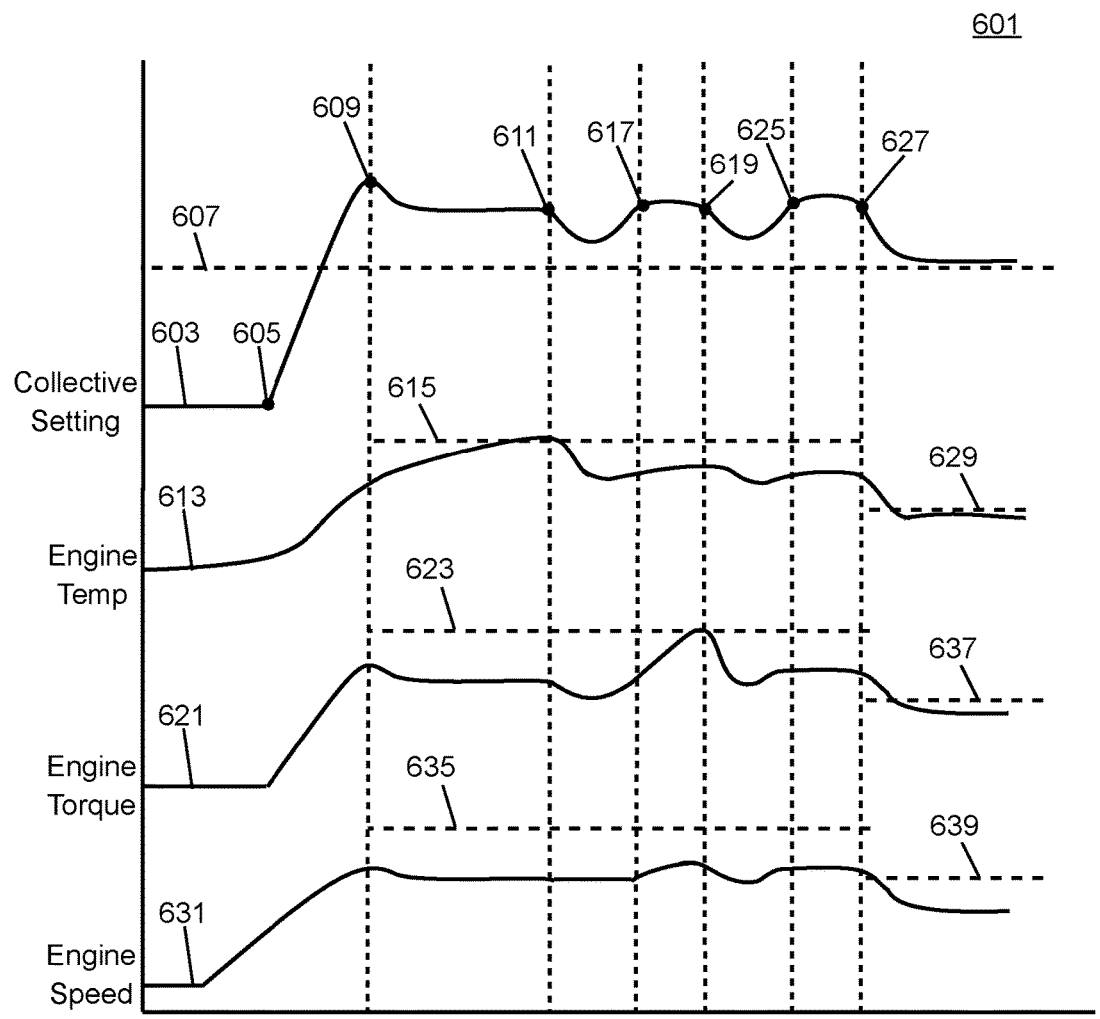
FIG. 6 is a chart illustrating flight parameters under the power hold according to some embodiments.

FIG. 6 is a chart 601 illustrating flight parameters under the power hold according to some embodiments. The chart 601 illustrates an example of operation parameters including engine temperature 613, an engine torque 621, and engine speed 631 in relation to a collective setting 603. The FCCs determine an overdrive threshold 607 for the collective setting 603 or collective stick position. When the pilot takes off at point 605, the pilot increases the collective setting 603 until the collective is overdriven and exceeds the overdrive threshold 607. The engine temperature 613, engine torque 621, and engine speed increase as the engine supplies additional power for the increasing collective setting 603. At a second point 609, the pilot engages the power hold, and the FCCs determine the power setting, and a first temperature limit 615, a first torque limit 623 and a first speed limit 635 associated with the selected power setting. The FCCs may then cause the collective setting 603 to be set to a setting associated with the power setting. In an embodiment, the collective setting associated with the power setting may be determined based on the allowable limits associated with the power setting. For example, the FCCs may determine the predicted power output for the engines at, or just below, the limits for the power setting, and set the collective setting based on the predicted engine power output.

As the rotorcraft flies, one or more of the operating parameters 613, 621 and 631 may approach their respective limits 615, 623 and 635. For example, at a third point 611, the FCCs may detect that the engine temperature 613 is approaching the first temperature limit 615, and reduce the collective setting to lower the amount of power required from the engine and give the engine time to cool down. Once the engine temperature drops, the FCCs may determine that the engine has additional power available within the operational limits of the power setting, and increase the collective to optimize the rotorcraft performance to use the available power at the most advantageous collective setting. In some embodiments, the FCCs may maintain the reduced power setting until the relevant operating parameter drops below a certain threshold before increasing the power again. In some embodiments, the threshold is a predefined number, and in other embodiments, the threshold may be based on the relevant limit. For example, if the engine temperature 613 is determined to be approaching the first temperature limit 615, the FCC may reduce the collective setting 603 until the temperature drops a fixed amount, such as 50° C., below the first temperature limit 615, or an amount based on the first temperature limit 615, such as 5% below the temperature limit. In some embodiments, the FCCs may raise the collective when the value of each of operating parameters is outside of a threshold of a respective operating limit. Additionally, when the FCCs determine the operational parameters 613, 621, 631 have stabilized or corrected, the FCCs may determine a new collective setting different from the original collective setting associated with the power limit to avoid continuous cycling between normal power hold collective setting and the reduced collective setting.

After the operational parameters are stabilized under the reduced collective setting and the collective setting is raised at the fourth point 617, the rotorcraft may continue on the power hold mode with the collective setting 603 associated with the power hold. At a fifth point 619, the engine torque 621 may approach a first torque limit 623, due, for example, to the pilot maneuvering the rotorcraft, weather conditions such as gusts or updrafts/downdrafts, or the pilot adjusting the airspeed of the rotorcraft. When the FCCs determine that the engine torque 621 is approaching the first torque limit 623, the FCCs may again reduce the collective setting 603 to reduce the power required from the engine, and may raise the collective setting when the torque subsides. At a sixth point 625, the FCCs may cause the rotorcraft to again resume flight under the power hold at the collective setting 603 associated with the selected power setting. At a seventh point 627, the pilot may select a new power setting, for example, by changing from a MTOP power setting to an MCP power setting after the rotorcraft clears the takeoff area or airfield. The FCCs may determine a second temperature limit 629, a second torque limit 637, and a second speed limit 639 associated with the new power setting. The FCCs may then use the new limits 629, 637 and 639 to determine whether the collective setting 603 needs to be adjusted to provide optimized power output.

In an embodiment system, a rotorcraft includes a collective control and a collective position sensor connected to the collective control, and the collective position sensor is operable to generate collective position signals indicating a position of the collective control. A flight control computer (FCC) is in signal communication with the collective position sensor and is operable to provide a power hold for the rotorcraft in response to a power hold activation signal and further in response to a first one of the collective position signals indicating that the collective control is overdriven. The FCC is further operable to determine a power setting for the power hold and one or more operational limits associated with the power hold. The rotorcraft further includes a collective trim motor connected to the collective control and in signal communication with the FCC and one or more flight control devices connected to the FCC and operable to control flight of the rotorcraft in response to a flight control device control signal received from the FCC. The FCC is operable to determine a flight parameter for the one or more flight control devices according to a relationship between the one or more operational limits and one or more operational parameters indicated by one or more sensor signals received at the FCC, and is further operable to determine a pilot control setting according to the flight parameter and generate a collective set command according to the pilot control setting. The collective trim motor is operable to move the collective control according to the collective set command, and wherein the FCC is operable to generate the flight control device control signal according to a second one of the collective position signals, and to send the flight control device control signal to the one or more flight control devices.

In some embodiment, the FCC is further operable to determine the power setting for the power hold according to an operating regime of the rotorcraft. In some embodiments, the operating regime is determined according to a number of engines operable to power the rotorcraft. In some embodiments, the FCC is further operable to determine the power setting by selecting, in response to the operating regime being a twin engine operating regime, the power setting from a maximum continuous power setting and a maximum takeoff power setting, and wherein the FCC is further operable to determine the power setting by selecting, in response to the operating regime being a single engine operating regime, the power setting from the maximum continuous power setting, a thirty second maximum power setting, and two minute maximum power setting. In some embodiments, the FCC is further operable to determine the power setting by selecting as the power setting a selected power setting set by a pilot in response to the pilot selecting the power setting, and by selecting a default power setting in response to the pilot not selecting the power setting. In some embodiments, the FCC is further operable to determine the flight parameter for the one or more flight control devices by determining an adjustment to a collective setting of the rotorcraft according to the relationship between the one or more operational limits and the one or more operational parameters indicated by one or more sensor signals received at the FCC. In some embodiments, the FCC is further operable to determine the adjustment to the collective setting to be a decrease in the collective setting in response to the FCC determining, according to one or more of the operational limits and at least one of a value of the one or more operational parameters and a rate of change of the one or more operational parameters, that the one or more operational parameters need to be mitigated.

An embodiment flight control system computer (FCC) for a rotorcraft includes a processor and a non-transitory computer-readable storage medium storing a program to be executed by the processor, the program including instructions for providing a power hold. The instructions for providing the power hold include instructions for adjusting one or more flight parameters according to an operational limit associated with a power setting selected according to at least an operating regime of the rotorcraft, controlling positioning of one or more pilot controls according to the flight parameters, and controlling one or more flight control devices of the rotorcraft according to positioning of the one or more pilot controls.

In some embodiments, the instructions for providing the power hold further include instructions for selecting, in response to the operating regime being a twin engine operating regime, the power setting from a maximum continuous power setting and a maximum takeoff power setting, and selecting, in response to the operating regime being a single engine operating regime, the power setting from a maximum continuous power setting, a thirty second maximum power setting, and two minute maximum power setting. In some embodiments, the FCC further includes a computer readable memory. The instructions for providing the power hold further include instructions for receiving a selected power setting indication for the operating regime and saving, in the computer readable memory, a selected power setting associated with the selected power setting indication, using the selected power setting associated with the operating regime in response to the memory having a saved selected power limit associated with the operating regime, and using a default power setting associated with the operating regime in response to the memory not having a saved selected power limit associated with the operating regime. In some embodiments, the instructions for providing the power hold include instructions for providing the power hold in response to receiving a power hold indication signal sent from a power hold indication device while a position of a collective pilot control of the rotorcraft is in an overdrive range. In some embodiments, the program further includes instructions for providing a second function in response to receiving the power hold indication signal when the position of the collective pilot control is outside of the overdrive range. In some embodiments, the instructions for providing the power hold further include instructions for adjusting a collective setting of the rotorcraft to optimize performance of the rotorcraft while maintaining a main rotor revolutions per minute (RPM) within a selected range. In some embodiments, the instructions for providing the power hold further include instructions for releasing the power hold in response to receiving a power hold release signal sent from the power hold indication device while the power hold is being provided. The power hold indication device is separate from a device from which the selected power setting indication is received.

An embodiment of a method for operating a rotorcraft includes providing a power hold by performing monitoring one or more operational parameters of the rotorcraft during flight, determining whether at least one of the one or more operational parameters need adjustment according to a relationship between the one or more operational parameters and one or more operating limits associated with a power setting for the power hold, and determining a flight parameter for one or more flight control devices of the rotorcraft in response to determining that at least one of the one or more operational parameters need adjustment. Providing the power hold further includes sending a position set signal to a trim assembly of the rotorcraft to set a first position of a pilot control connected to the trim assembly according to a pilot control setting generated according to the flight parameter, and controlling a flight control device control according to a second position of the pilot control.

In some embodiments, the one or more operational parameters include an engine temperature, an engine revolutions per minute (RPM) and an engine torque. In some embodiments, the determining whether at least one of the one or more operational parameters need adjustment includes determining that a value of a first operating parameter of the one or more operating parameters is one of within a predetermined range of a first operating limit of the one or more operating limits or greater than a predetermined percentage of the first operating limit. In some embodiments, determining the flight parameter for one or more flight control devices includes determining to reduce a collective setting of the rotorcraft in response to determining that the value of the first operating parameter is one of within the predetermined range of the first operating limit of the one or more operating limits or greater than the predetermined percentage of the first operating limit, and determining to reduce the collective setting in response to determining that the value of each of the one or more operating parameters is outside of a threshold of a respective one of the one or more operating limits. In some embodiments, determining whether at least one of the one or more operational parameters need adjustment comprises determining whether at least one of the one or more operational parameters need adjustment according to a rate of change and a value of a first operating parameter of the one or more operating parameters indicating that the first operating parameter is predicted to exceed at least one of the one or more operating limits within a predetermined time period. In some embodiments, providing the power hold includes providing the power hold in response to receiving a power hold indication signal sent from a power hold indication device while the pilot control is positioned in an overdrive range, and the method further includes providing a second function in response to receiving the power hold indication signal when the position of the pilot control is outside of the overdrive range.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
a collective control;
a collective position sensor connected to the collective control, wherein the collective position sensor is operable to generate collective position signals indicating a position of the collective control;
a flight control computer (FCC) in signal communication with the collective position sensor and operable to provide a power hold for the rotorcraft in response to a power hold activation signal and further in response to a first one of the collective position signals indicating that the collective control is overdriven, wherein the FCC is further operable to determine a power setting for the power hold and one or more operational limits associated with the power hold;
a collective trim motor connected to the collective control and in signal communication with the FCC; and
one or more flight control devices connected to the FCC and operable to control flight of the rotorcraft in response to a flight control device control signal received from the FCC;
wherein the FCC is operable to determine a flight parameter for the one or more flight control devices according to a relationship between the one or more operational limits and one or more operational parameters indicated by one or more sensor signals received at the FCC, wherein the FCC is further operable to determine a pilot control setting according to the flight parameter and generate a collective set command according to the pilot control setting;
wherein the collective trim motor is operable to move the collective control according to the collective set command; and
wherein the FCC is operable to generate the flight control device control signal according to a second one of the collective position signals, and to send the flight control device control signal to the one or more flight control devices.

2. The rotorcraft of claim 1, wherein the FCC is further operable to determine the power setting for the power hold according to an operating regime of the rotorcraft.

3. The rotorcraft of claim 2, wherein the FCC is further operable to determine the power setting by selecting as the power setting a selected power setting set by a pilot in response to the pilot selecting the power setting, and by selecting a default power setting in response to the pilot not selecting the power setting.

4. The rotorcraft of claim 2, wherein the operating regime is determined according to a number of engines operable to power the rotorcraft.

5. The rotorcraft of claim 4, wherein the FCC is further operable to determine the power setting by selecting, in response to the operating regime being a twin engine operating regime, the power setting from a maximum continuous power setting and a maximum takeoff power setting, and wherein the FCC is further operable to determine the power setting by selecting, in response to the operating regime being a single engine operating regime, the power setting from the maximum continuous power setting, a thirty second maximum power setting, and two minute maximum power setting.

6. The rotorcraft of claim 1, wherein the FCC is further operable to determine the flight parameter for the one or more flight control devices by determining an adjustment to a collective setting of the rotorcraft according to the relationship between the one or more operational limits and the one or more operational parameters indicated by one or more sensor signals received at the FCC.

7. The rotorcraft of claim 6, wherein the FCC is further operable to determine the adjustment to the collective setting to be a decrease in the collective setting in response to the FCC determining, according to one or more of the operational limits and at least one of a value of the one or more operational parameters and a rate of change of the one or more operational parameters, that the one or more operational parameters need to be mitigated.

8. A flight control system computer (FCC) for a rotorcraft, comprising:
a processor; and
a non-transitory computer-readable storage medium storing a program to be executed by the processor, the program including instructions for providing a power hold, the instructions for providing the power hold including instructions for:
receiving a power hold indication signal sent from a power hold indication device;
determining a power setting selected according to at least an operating regime of the rotorcraft, wherein the power setting is a selected power setting associated with the operating regime in response to having a saved selected power limit associated with the operating regime, and wherein the power setting is a default power setting associated with the operating regime in response to not having a saved selected power limit associated with the operating regime;
adjusting one or more flight parameters according to an operational limit associated with the power setting;
controlling positioning of one or more pilot controls according to the flight parameters; and
controlling one or more flight control devices of the rotorcraft according to positioning of the one or more pilot controls.

9. The FCC of claim 8, wherein the instructions for providing the power hold further include instructions for:
selecting, in response to the operating regime being a twin engine operating regime, the power setting from a maximum continuous power setting and a maximum takeoff power setting; and
selecting, in response to the operating regime being a single engine operating regime, the power setting from a maximum continuous power setting, a thirty second maximum power setting, and two minute maximum power setting.

10. The FCC of claim 8, further comprising a computer readable memory; and
wherein the instructions for providing the power hold further include instructions for:
receiving a selected power setting indication for the operating regime and saving, in the computer readable memory, the selected power setting associated with the selected power setting indication.

11. The FCC of claim 10, wherein the instructions for providing the power hold comprise instructions for providing the power hold in response to receiving the power hold indication signal sent from the power hold indication device while a position of a collective pilot control of the rotorcraft is in an overdrive range.

12. The FCC of claim 11, wherein the program further includes instructions for providing a second function in response to receiving the power hold indication signal when the position of the collective pilot control is outside of the overdrive range.

13. The FCC of claim 11, wherein the instructions for providing the power hold further include instructions for adjusting a collective setting of the rotorcraft to optimize performance of the rotorcraft while maintaining a main rotor revolutions per minute (RPM) within a selected range.

14. The FCC of claim 11, wherein the instructions for providing the power hold further include instructions for releasing the power hold in response to receiving a power hold release signal sent from the power hold indication device while the power hold is being provided; and
   wherein the power hold indication device is separate from a device from which the selected power setting indication is received.

15. A method for operating a rotorcraft, comprising:
   providing a power hold by performing:
      receiving a power hold indication signal sent from a power hold indication device;
      determining a power setting selected according to at least an operating regime of the rotorcraft and in response to the power hold indication signal, wherein the power setting is a selected power setting associated with the operating regime in response to having a saved selected power limit associated with the operating regime, and wherein the power setting is a default power setting associated with the operating regime in response to not having a saved selected power limit associated with the operating regime;
      adjusting one or more flight parameters according to an operational limit associated with the power setting and in response to the power hold indication signal;
      monitoring, in response to the power hold indication signal, one or more operational parameters of the rotorcraft during flight;
      determining, in response to the power hold indication signal, whether at least one of the one or more operational parameters need adjustment according to a relationship between the one or more operational parameters and one or more operating limits associated with the power setting;
      determining, in response to the power hold indication signal, a flight parameter for one or more flight control devices of the rotorcraft in response to determining that at least one of the one or more operational parameters need adjustment;
      sending, in response to the power hold indication signal, a position set signal to a trim assembly of the rotorcraft to set a first position of a pilot control connected to the trim assembly according to a pilot control setting generated according to the flight parameter; and
      controlling a flight control device according to a second position of the pilot control.

16. The method of claim 15, wherein the one or more operational parameters include an engine temperature, an engine revolutions per minute (RPM) and an engine torque.

17. The method of claim 15, wherein the determining whether at least one of the one or more operational parameters need adjustment comprises determining that a value of a first operating parameter of the one or more operating parameters is one of within a predetermined range of a first operating limit of the one or more operating limits or greater than a predetermined percentage of the first operating limit.

18. The method of claim 17, wherein the determining the flight parameter for one or more flight control devices comprises:
   determining to reduce a collective setting of the rotorcraft in response to determining that the value of the first operating parameter is one of within the predetermined range of the first operating limit of the one or more operating limits or greater than the predetermined percentage of the first operating limit; and
   determining to reduce the collective setting in response to determining that the value of each of the one or more operating parameters is outside of a threshold of a respective one of the one or more operating limits.

19. The method of claim 15, wherein the determining whether at least one of the one or more operational parameters need adjustment comprises determining whether at least one of the one or more operational parameters need adjustment according to a rate of change and a value of a first operating parameter of the one or more operating parameters indicating that the first operating parameter is predicted to exceed at least one of the one or more operating limits within a predetermined time period.

20. The method of claim 15, wherein the providing the power hold comprises providing the power hold in response to receiving the power hold indication signal sent from the power hold indication device while the pilot control is positioned in an overdrive range; and
   wherein the method further comprises providing a second function in response to receiving the power hold indication signal when the position of the pilot control is outside of the overdrive range.

\* \* \* \* \*